May 16, 1933.  E. O. HAMREN  1,909,349
AXLE MOUNTING
Filed Nov. 8, 1929
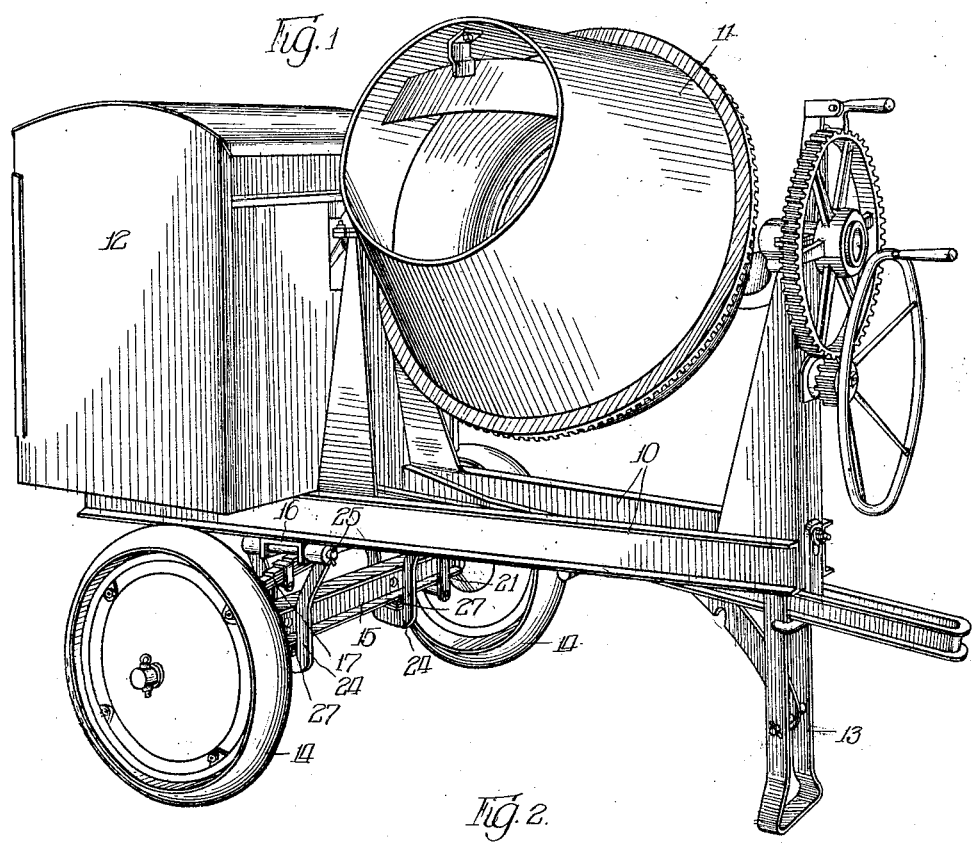
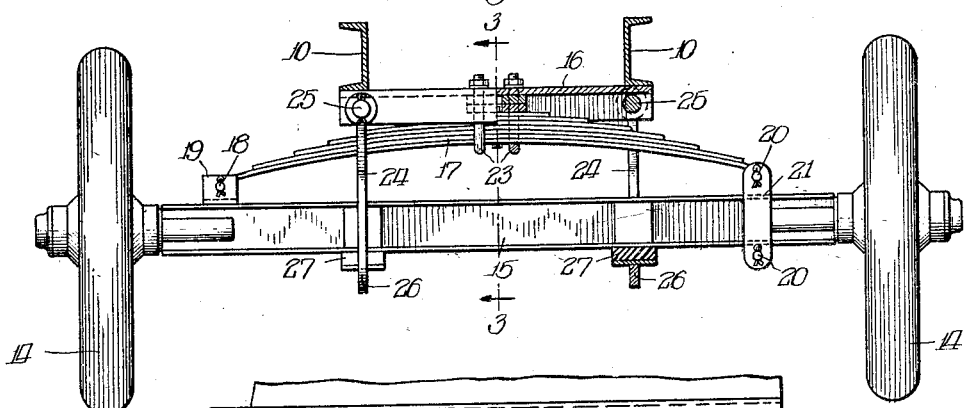
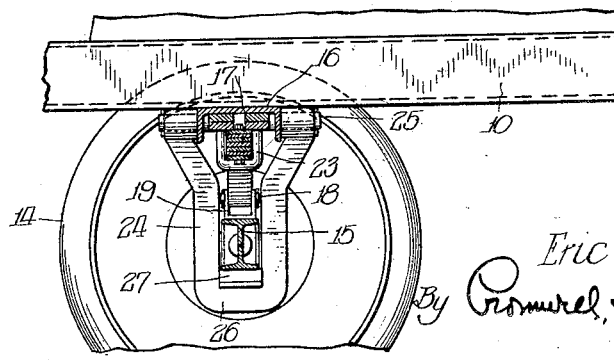
Inventor:
Eric O. Hamren, Patented May 16, 1933

1,909,349

UNITED STATES PATENT OFFICE

ERIC O. HAMREN, OF OSHKOSH, WISCONSIN, ASSIGNOR TO LEACH COMPANY, OF OSHKOSH, WISCONSIN, A CORPORATION OF WISCONSIN

AXLE MOUNTING

Application filed November 8, 1929. Serial No. 405,558.

This invention has to do with the two- and four-wheeled frames on which mixers of various types are hauled about from place to place and operated.

The primary object of the invention is to provide an improved mounting for the rear axle of such a frame, which mounting possesses smooth-riding qualities, is simple, compact and rugged in construction, is inexpensive to manufacture and will stand up under the most severe usage.

Other objects and advantages of the invention will be apparent to those skilled in the art upon a full understanding of the construction, arrangement and operation of the novel axle mounting.

One form of the invention is presented herein for the purpose of exemplification, but it will of course be appreciated that the invention is susceptible of embodiment in other structurally modified forms coming equally within the scope of the appended claims.

In the accompanying drawing:

Fig. 1 is a perspective view of a tilting type concrete mixer equipped with the axle mounting of the invention;

Fig. 2 is a partially sectioned rear end elevation; and

Fig. 3 is a vertical section, taken on the line 3—3 of Fig. 2.

The frame shown in the drawing is of the two-wheeled cart type and includes a pair of longitudinal sill members 10 on which a mixer 11 and a motor 12 are mounted for operation. The front end of the frame is supported, when not in transit, on a centrally arranged leg 13, while the rear end of the frame is supported on a pair of wheels 14 which are journaled on the ends of an axle 15.

The axle 15 is arranged directly beneath a cross member 16 of the frame, in spaced parallel relation to the latter, and carries an upwardly bowed leaf spring 17 which is connected at its ends to the axle and at its center to the cross member 16. One end of the spring is pivoted at 18 to a bracket 19 which is rigidly attached to one end of the axle, while the other end of the spring is pivoted at 20 to an arm 21 which is in turn pivoted at 22 to the other end of the axle, thereby permitting the spring to flex freely up and down. The center of the spring is rigidly clamped to the center of the cross member 16 by U-bolts 23.

The axle 15 is prevented from tilting forwardly or rearwardly by a pair of U-shaped yokes 24 which pass under the axle adjacent the ends of the latter and extend upwardly along the front and rear faces of the axle and the front and rear edges of the spring into lapped relation with the front and rear faces of the cross member 16, to which member they are attached by transfixing pins 25. The front and rear faces of the axle are disposed in parallel vertical planes, the axle preferably being of I-beam construction, and the edges of the yoke in opposition to the front and rear faces of the axle are also parallel to each other and are spaced apart only far enough to permit the axle to slide freely up and down therebetween without tilting.

The yokes 24 normally project a short distance below the axle, and are provided, in the horizontally extending bottom portions 26 thereof, with cushioning blocks 27 of rubber or other resiliently yieldable material for coaction with the bottom of the axle upon rebound of the spring. When the cross member 16 moves up and down with respect to the axle 15, it shifts laterally a little at the same time due to the nature of the coupling between the axle and the spring 17. To prevent the yokes 24 from interfering in any way with such lateral shifting movement, the attaching pins 25 are made to serve as pivots for the yokes, thereby allowing the latter to swing with the axle.

The yokes 24 function advantageously in several ways. They prevent the axle from tilting forwardly or rearwardly, eliminate the necessity of radius rods, serve as guides for the spring as well as the axle, limit the extent of separation between the axle and the frame, cushion the rebound of the spring, and limit the degree to which the frame can tilt laterally with respect to the axle against the resistance of the spring.

I claim:

1. In a vehicle, a frame, an axle, a pair of wheels journaled on the axle, an upwardly bowed leaf spring positioned lengthwise of the axle between the latter and the frame, flexible connections between the ends of the spring and the ends of the axle, a rigid connection between the center of the spring and the center of the frame, and means carried by the frame at opposite sides of the spring and axle for preventing the latter from tilting forwardly or rearwardly.

2. In a vehicle, a frame having a cross member adjacent the rear end thereof, an axle directly beneath the cross member in spaced parallel relation thereto, a pair of wheels journaled on the axle, a bowed leaf spring positioned lengthwise of the axle between the latter and the cross member, flexible connections between the ends of the spring and the ends of the axle, a rigid connection between the center of the spring and the center of the cross member, and a pair of vertically extending U-shaped yokes looped under the axle and attached to the cross member adjacent the ends of the latter.

3. In a vehicle, a frame having a cross member adjacent the rear end thereof, an axle directly beneath the cross member in spaced parallel relation thereto, a pair of wheels journaled on the axle, a bowed leaf spring positioned lengthwise of the axle between the latter and the cross member, flexible connections between the ends of the spring and the ends of the axle, a rigid connection between the center of the spring and the center of the cross member, a pair of vertically extending U-shaped yokes looped under the axle and attached to the cross member adjacent the ends of the latter in sliding contact with the front and rear faces of the axle for preventing the latter from tilting forwardly or rearwardly, and resilient members carried by the yokes beneath the axle for cushioning the latter upon rebound of the spring.

4. In a vehicle, a frame having a cross member adjacent the rear end thereof, an axle directly beneath the cross member in spaced parallel relation thereto, a pair of wheels journaled on the axle, a bowed leaf spring positioned lengthwise of the axle between the latter and the cross member, connections between the ends of the spring and the ends of the axle, a connection between the center of the spring and the center of the cross member, and a pair of vertically extending U-shaped yokes looped under the axle and pivotally attached to the cross member adjacent the ends of the latter in sliding contact with the front and rear faces of the axle for preventing the latter from tilting forwardly or rearwardly.

5. In a vehicle, a frame having a cross member adjacent the rear end thereof, an axle directly beneath the cross member in spaced parallel relation thereto, a pair of wheels journaled on the axle, a bowed leaf spring positioned lengthwise of the axle between the latter and the cross member, connections between the ends of the spring and the ends of the axle, a connection between the center of the spring and the center of the cross member, and a pair of vertically extending U-shaped yokes looped under the axle and attached to the cross member adjacent the ends of the latter, said yokes being outspread at their points of attachment.

6. In a vehicle, a frame member, an axle member, a pair of wheels journaled on the axle member, a spring positioned lengthwise of the axle member between the latter and the frame member, flexible connections between the ends of the spring and the ends of one of said members, a rigid connection between the center of the spring and the center of the other of said members, and vertically extending guide means for preventing the axle member from tilting forwardly or rearwardly.

In witness whereof I have hereunto subscribed my name.

ERIC O. HAMREN.